United States Patent
Sinclair et al.

(10) Patent No.: US 6,279,656 B1
(45) Date of Patent: Aug. 28, 2001

(54) DOWNHOLE CHEMICAL DELIVERY SYSTEM FOR OIL AND GAS WELLS

(75) Inventors: A. Richard Sinclair, Katy; S. Byron Smith, Houston, both of TX (US)

(73) Assignee: Santrol, Inc., Fresno, TX (US)

( * ) Notice: Subject to any disclaimer, the term of this patent is extended or adjusted under 35 U.S.C. 154(b) by 0 days.

(21) Appl. No.: 09/433,178

(22) Filed: Nov. 3, 1999

(51) Int. Cl.$^7$ .................................................. E21B 43/00
(52) U.S. Cl. ..................... 166/310; 166/304; 166/311; 166/376; 166/902; 507/903; 507/939
(58) Field of Search .................................... 166/304, 309, 166/310, 311, 312, 296, 371, 376, 205, 227, 902; 507/903, 939

(56) References Cited

U.S. PATENT DOCUMENTS

| | | | |
|---|---|---|---|
| 3,907,868 | 9/1975 | Currie et al. ...................... 260/475 D |
| 4,039,717 | * 8/1977 | Titus ..................... 428/389 |
| 4,061,787 | 12/1977 | Higgins .............. 426/140 |
| 4,526,695 | 7/1985 | Erbstoesser et al. ........... 252/8.55 R |
| 4,614,599 | 9/1986 | Walker .............. 252/8.512 |
| 4,670,166 | * 6/1987 | McDougall et al. ............. 252/8.522 |
| 4,676,196 | 6/1987 | Lojek et al. .............. 119/1 |
| 4,711,783 | 12/1987 | Huc et al. .......... 424/460 |
| 4,716,964 | 1/1988 | Erbstoesser et al. ............ 166/284 |
| 4,836,940 | * 6/1989 | Alexander .......... 252/8.512 |
| 5,051,304 | 9/1991 | David et al. ..... 428/402.2 |
| 5,062,484 | * 11/1991 | Schroeder et al. .... 166/278 |
| 5,073,276 | * 12/1991 | Newlove et al. ........ 252/8.551 |
| 5,082,563 | 1/1992 | Webb et al. .......... 210/631 |
| 5,186,259 | 2/1993 | Teichman ............. 168/24 |
| 5,195,465 | 3/1993 | Webb et al. .......... 119/172 |
| 5,212,008 | 5/1993 | Malhotra et al. ........ 428/216 |
| 5,307,874 | 5/1994 | Lowther ............. 166/288 |
| 5,352,780 | 10/1994 | Webb et al. ............ 536/56 |
| 5,404,951 | 4/1995 | Lai et al. ............ 166/295 |
| 5,429,741 | 7/1995 | Webb et al. ............ 210/242.4 |
| 5,544,705 | 8/1996 | Jones et al. ............ 166/250.4 |
| 5,609,768 | 3/1997 | Mueller et al. ............. 210/691 |
| 5,614,458 | 3/1997 | Webb et al. ............ 502/401 |
| 5,643,569 | 7/1997 | Jain et al. ................ 424/93.7 |
| 5,739,118 | 4/1998 | Carrano et al. ............ 514/44 |
| 5,955,144 | 9/1999 | Sinclair et al. ............. 427/214 |
| 5,964,291 | * 10/1999 | Bourne et al. ............. 166/279 |

* cited by examiner

*Primary Examiner*—William Neuder
*Assistant Examiner*—Zakiya Walker
(74) *Attorney, Agent, or Firm*—Howrey Simon Arnold & White

(57) ABSTRACT

The invention is the method of treating of a well, a formation, or both, with the solids, liquids, or apparatuses, by 1) encasing the solids, liquids, or apparatuses in a water-soluble shell, 2) conveying the encased solids, liquids, or gases to the predetermined location in the well, and then 3) allowing the water-soluble shell to dissolve in the aqueous phase in the wellbore. The shell is preferably made of water-soluble polymers such as collagen, a crosslinking agent such as zolidine, optionally a hydrophobic compound such as a processed oil, and water used in processing. Other modifying or conditioning compounds, for example glycerin and other polymeric additives, may be incorporated to extend the strength or temperature range of the shell. The shell encases a variety of solids, liquids, or combinations thereof, where the solids or liquids are useful in the treatment of the well or of the producing formation. Illustrative encased material includes soap, acid, corrosion inhibitors, chelating agents, scale inhibitors, mutual solvents, paraffin inhibitors, paraffin dissolvers, clay stabilizers, and tracer materials. The encased materials may also be apparatuses, such as a prefabricated screen completion or a prefabricated sand-pack.

39 Claims, No Drawings

DOWNHOLE CHEMICAL DELIVERY SYSTEM FOR OIL AND GAS WELLS

FIELD OF THE INVENTION

The invention relates generally to a dissolvable encapsulating material, and to its use to convey materials, chemicals, and other devices down a wellbore.

BACKGROUND OF THE INVENTION

In the oils and gas industry there are producing wells which range from several hundred feet to over 20,000 feet in depth. These wells are narrow, often less than six inches in diameter. In addition, these wells typically have smaller diameter tubes suspended therein. It is often necessary to place chemicals or other apparatus at or near the bottom of the wellbore.

In the case of fluids, the current methods of placing chemicals near or at the bottom of a wellbore are to either push a plug of the fluid down the well, displacing fluid in the wellbore, or to suspend a small diameter tube, often called a coiled tube, down the well, and push the fluid down this coiled tube. Both methods have substantial drawbacks. The chemical may absorb or react with components in the wellbore during transit. Additionally, a substantial quantity of fluid and material suspended therein that was in the wellbore is displaced into the producing formation. In many cases this is not desirable. The use of coiled tubing solves many of these problems, but the cost and risk of hanging a small diameter tube into a wellbore is substantial. Also, corrosive attack of this coiled tubing from injected chemicals is often particularly severe, as the pipe walls tend to be thin compared to the well tubulars.

In the case of solids, solids are often displaced as a slurry into the bottom of the well. Accordingly, many of the problems associated with injecting fluids are present.

There is one method where a particular chemical is coated and then is either placed, allowed to fall, or displaced to a predetermined location in the well. This is soap, used to help foam a well and thereby increase the effect of gas lift. The prior art method of insulating the soap solids during transit down a well is to encase the soap in wax. The encased soap is then put downhole, where wax dissolves as the temperature increases.

In certain wells, particularly deep and hot wells, wax encasement is not particularly useful. For example, it is often desirable to place a foaming soap at the bottom of a deep well. The chemicals take longer to place than for a shallower well. The prior art soap-sticks encased in wax had the obvious shortcoming that waxes often melted prematurely, especially in deep wells where prior production had heated the wellbore. Wells generally follow the geothermal gradient, with hot temperatures downhole and cooler near-ambient temperatures near the ground surface. As a rule, the deeper the well, the hotter the bottomhole temperature.

The presence of hot oil and other chemicals, including encapsulated chemicals, may accelerate the dissolution. Furthermore, as the temperature increases, some temperature-activated or temperature-sensitive chemicals exposed by the degradation of the wax to fluids in the wellbore may react prematurely.

Occasionally, especially when fluids had been circulated to the bottom of the wellbore or displaced into the producing formation, thereby cooling the wellbore, waxes do not melt sufficiently fast to provide chemical needed for a start-up. Wax has the additional problem of lacking mechanical strength, especially as the temperature warmed, and wax might easily be abraded off an encased apparatus.

Larger apparatuses, such as resin coated screen and the like, are often difficult to place because the apparatus is easily damaged during transit down a wellbore. Protective material is not often utilized, because such material eventually becomes problematic trash in the wellbore. Wax provides inadequate protection for such apparatuses.

The last few years have witnessed a drastic increase in research on encapsulated products and methods to produce such products. This is particularly so in the pharmaceutical field. And it is now becoming recognized that encapsulation technology may be useful in many other fields.

U.S. Pat. No. 3,971,852 describes a process for encapsulating various fragrance oils such as oils with citrus and spice odors. The oils are encapsulated in a matrix comprised of polysaccharide and polyhydroxy compounds by converting an emulsion of the fragrance oil droplets in a solution of the matrix ingredients to an encapsulated solid state during a spray drying process. The patent also mentions that miscellaneous chemicals can be encapsulated by the invention method such as drilling fluids and waxes. U.S. Pat. No. 4,269,279 discloses the use of plastic coated magnetic particles in a bead form to increase lubrication for drilling fluids. The encapsulated ferromagnetic particles can be recovered for reuse with a magnetic separator.

An encapsulated invention which has been disclosed for use in boreholes is described in U.S. Pat. No. 4,078,612. The patent describes an explodable material encapsulated in natural gums slurried in a liquid vehicle. The material is pumped into the formation around the wellbore and exploded to increase permeability.

Another U.S. Pat. No. 4,036,301 describes an encapsulated material useful in cementing a well, wherein a cement accelerator is encapsulated in a waxy material and placed within a highly retarded cement slurry. The cement slurry is pumped into the well with the encapsulated accelerator. After proper placement of the cement, circulation is decreased so that the temperature of the cement fluid approaches the bottom hole temperature of the well and melts the encapsulated material, freeing the accelerator which sets the cement.

U.S. Pat. No. 4,362,566 discloses an additional use of encapsulated materials. The patent suggests encapsulating one component of a two or more component adhesive or cement mixture so that the adhesive or cement will not set until the encapsulated component is freed from its reaction-preventive casing.

What is needed is a coating that provided mechanical strength and that can insulate solids, liquids, and even gases during transit down a wellbore, but does not decompose prematurely, and does not leave residue.

SUMMARY OF THE INVENTION

The invention is a dissolvable shell composition encasing a material or apparatus, that 1) provides mechanical strength sufficient to protect the encased material during transit down wellbores, including deep and hot wells, and 2) that once dissolved the shell does not leave residue.

The shell is comprised of water-soluble polymers, preferably collagen, a crosslinking agent, preferably an oxazole or an oxazolidine, and optionally modifying compounds including, for example, a hydrophobic compound such as a processed oil, and water used in processing. Other modifying or conditioning compounds, for example glycerin and other polymeric additives, may be incorporated to extend the strength or temperature range of the shell. Residual water typically remains in the shell composition even after extensive curing.

The shell encases a variety of solids, liquids, or combinations thereof, where said solids or liquids are useful in the treatment of the well or of the producing formation. For illustration rather than limitation, the encased material can be soap, acid, corrosion inhibitors, chelating agents, scale inhibitors, mutual solvents, paraffin inhibitors, paraffin dissolvers, clay stabilizers, tracer materials, or other materials useful in the treatment of the well or formation. The encased materials may also be apparatuses, such as a prefabricated screen completion or a prefabricated sand-pack.

The invention is also the method of treating of a well, a formation, or both, with the solids, liquids, or apparatuses, by 1) encasing said solids, liquids, or apparatuses in a dissolvable shell, 2) conveying said encased solids, liquids, or gases to the predetermined location in the well, and then 3) allowing the shell composition to dissolve or decompose in the aqueous phase in the wellbore.

DETAILED DESCRIPTION OF THE INVENTION

The invention is shell compositions that provide mechanical strength and that can insulate solids and liquids during transit down a wellbore. As used herein, the terms "shell" and "casing" are used interchangeably, and refer to the water-soluble material that provides insulation from wellbore fluids, mechanical strength, or both during transit down a wellbore. The invention is also the various materials and/or apparatuses encased in protective shells for use in wellbores. The invention is also a method of treating wells and formations using the materials transported downhole using protective shells.

The shell must substantially encase the materials or apparatuses to be conveyed downhole. By substantially encase it is meant a the materials should be conveyed to the proper depth before being exposed to wellbore fluids. It is recognized, however, that small losses are not important in well treatment, where it is customary to use 20% to 100% excess for any chemical treatment as insurance. The degree of isolation the shell must provide from the wellbore environment depends on the cost of the material, the phase, that is, liquid or solid, and the speed with which the wellbore and fluids therein fluids may react with and render treating chemicals ineffective. For example, it is generally necessary to almost completely encase chemicals such as soap, that is, greater than about 90%, preferably greater than 98%, more preferably 100%, of the surface of the soap is initially covered and isolated from wellbore fluids by the shell. For liquids, including liquid surfactants, corrosion inhibitors, and the like, the shell must isolate the treatment liquid from the wellbore liquid so that at least about 70%, preferably 100%, of the treating liquid remains in the shell when the shell arrives at the desired depth. For solids, the required shell characteristics vary considerably. It is with the skill of one in the art, given the benefit of this disclosure, to design shell configurations to convey and to distribute the treating materials and apparatuses at the desired depth in a well where they will be most effective. For inert materials, such as a pre-made sand-control pack or screen, the shell must only encase or contact the apparatus sufficiently to support and maintain the apparatus integrity during transit down a wellbore. For soluble solids, the shell must isolate the solids from wellbore fluids so that an acceptable amount of the solids remain when the encased material reaches the desired depth.

The shell must be able to withstand the temperatures and the hostile environment of the wellbore for a pre-selected amount of time, so that the encased material can be placed in its desired location before the shell integrity is compromised. This will be a function of shell composition, shell thickness, and shell configuration.

However, the shell must eventually dissolve or decompose in the well fluid.

The shell comprises a water-soluble compound that is capable of being crosslinked. The compound may be a polymer. The compound is typically crosslinked, or partially crosslinked, before entering the well. Crosslinking involves mixing the crosslinker with the water-soluble compound, forming the material into the desired shape, and then letting the resulting shell cure for a predetermined amount of time. By partially crosslinked, it is meant either that the quantity of crosslinking material in the mixture is less than the amount needed to totally crosslink the compound, or that only a preselected portion of the shell, for example the exterior portion, is crosslinked. The material often need not be completely crosslinked, as crosslinking will increase the shell dissolution time.

By "water-soluble" it is meant that over a time period varying from about 1 hour to about 2 weeks, essentially all of the polymer or compound will be dis-aggregated and carried away by the water flux in a wellbore. The casing material need not form a solution when it dissolves in the aqueous phase, provided it dis-aggregates into sufficiently small particles, i.e., a colloid, that can be removed by the liquid flux in the well.

By "capable of being crosslinked" it is meant as is normally meant in the industry, that is, that the compound is reactable with at least one other compound that contains two or more reactive sites, called a crosslinker, and the reaction product has increased ability to withstand degradation by the environment, wherein the degradation can be either mechanical, such as abrasion, or chemical, such as dissolution.

The preferred water-soluble compound is collagen. Collagen is a fibrous protein found in connective tissue of animals, particularly in the skin, muscles, and tendons. Collagen is commercially available in the soluble (uncrosslinked) form or in various crosslinked forms. Regenerated collagen, such as is used in food, is obtained by neutralizing with acid collagen that is purified by alkaline treatment. Collagen can be converted to gelatin in boiling water. Said collagen may be partially decomposed into gelatin, provided the resulting material has the required strength and is resistant to degradation for a specified time at well conditions. Mixtures of collagen and gelatin may be appropriate under some circumstances.

Other water soluble polymeric material capable of being cross-linked by a crosslinking agent, including, for example, polysaccharides having at least one active group where the active groups is, for example, an hydroxy group, carboxy group, sulfate group, an amine group, or an amino group, are operable in the present invention.

Other water-soluble compounds include, for example, polysaccharide gums and starches such as hydroxyethyl starch and hydroxypropyl starch. Soluble cellulose is also operable in the present invention. Such cellulose includes methylcellulose, hydroxyethyl cellulose, hydroxypropyl cellulose, hydroxyethylmethyl cellulose, hydroxypropylmethyl cellulose, hydroxybutylmethyl cellulose, ethylhydroxyethyl cellulose, hydroxypropylhydroxyethyl cellulose, sodium cellulose sulfate, sodium carboxymethyl hydroxyethyl cellulose, diethytammoniumchloride hydroxyethyl cellulose, hydroxypropyl trimethyl ammonium chloride hydroxyethyl cellulose, and diethyl aminoethyl cellulose.

Other water soluble compounds include sodium carboxymethyl cellulose, gum arabic, carrageenan gum, karaya gum, xanthan gum, carboxymethyl hydroxypropyl guar, cationic guar, dimethyl ammonium hydrolyzed collagen protein, poly (ethylene oxide), poly (propylene oxide), poly (ethylene oxide)-poly (propylene oxide) block copolymers, poly (1,4-oxybutylene) glycol, poly (alkylene glycol diacrylates) where alkyl is methyl, ethyl, propyl and butyl, and mixtures thereof, are also operable under some circumstances.

The material capable of being crosslinked is present in any effective amount. Typically, the polymeric material is present in an amount of from about 5 to about 80 percent by weight of the shell, and preferably from about 10 to about 50 percent by weight of the shell, although the amount can be outside these ranges.

While a preferred composition is collagen, other water-soluble compounds such as those listed above may be used alone or in mixtures, including in mixtures with containing collagen.

The shell also comprises one or more cross-linking agents. The crosslinking agent is a material that crosslinks the polymeric material either chemically, by way of covalent bonding, or physically, by way of the formation of a complex. Generally, a cross-linker contains two or more reactive sites that bind with the selected water-soluble compounds. Examples of suitable crosslinking agents include hexamethoxymethylmelamine, such as Cymel 303, available from American Cyanamid Company, methylated melamines, such as Resimene 2040, available from Monsanto Chemical Company, partially methylated melamine-formaldehyde, such as Cymel 373, available from American Cyanamid Company, methylated urea-formaldehyde, such as Beetle 65, available from American Cyanamid Company, butylated urea-formaldehydes, such as Resimene 920, available from Monsanto Chemical Company, poly (vinyl amines), such as #1562, available from Poly Sciences Inc., cationic urea-formaldehyde resins, such as Resin 917, available from Hercules Chemical Company, and Poly Cup 917 resin available from Hercules Chemical Company, glutaraldehydes, such as those available from Aldrich Chemical Company, glyoxal-urea resins, such as Nopcote 1670, and Nopcote 1661, available from Henkel Corporation, dimethylaminomethyl phenols, such as DMP-10, available from Rohm and Haas, Inc., cationic polyamide-epichlorohydrins, such as the Kymene resins available from Hercules Chemical Company, oxazolidines, such as Zoldine ZT55, available from Angus Chemical Company, poly (aziridines), such as Xama 7, available from Hoechst Celanese Company, acrylamide polymers, such as poly (acrylamide) (such as #02806, available from Poly Sciences Inc.), acrylamideacrylic acid copolymers, such as #04652, #02220, and #18545, available from Poly Sciences Inc., poly (N,N-dimethylacrylamide), such as #004590, available from Poly Sciences Inc., poly (2-acrylamido-2-methyl propane sulfonic acid), such as #401, available from Scientific Polymer Products, chlorinated polymers, such as poly (methylene-guanidine) hydrochloride (such as #654, available from Scientific Polymer Products), poly (N,N-dimethyl-3,5 dimethylene piperidinium chloride), such as #175, available from Scientific Polymer Products, ethylene imine containing polymers, such as poly (ethylene imine) (such as #135, available from Scientific Polymer Products), poly (ethylene imine) epichlorohydrin, such as #634, available from Scientific Polymer Products, poly (ethylene imine) ethoxylated, such as #636, available from Scientific Polymer Products, and the like, as well as mixtures thereof. A preferred crosslinking agent for collagen is an oxazole, an oxazolidine, the compound Zoldine, or a mixture thereof.

Other operable crosslinking agents include methylated melamine-formaldehyde, methylated urea-formaldehyde, cationic urea-formaldehyde, glyoxal-urea resin, poly (acrylamide), acrylamide-acrylic acid copolymer, poly (2-acrylamido-2-methyl propane sulfonic acid), poly (N,N-dimethyl-3,5-dimethylene piperidinium chloride), glutaraldehyde, and mixtures thereof. Other crosslinking compounds are known in the art.

It may be beneficial to combine one or more cross-linking agents into the shell composition.

The crosslinking agent is present in the shell in any effective amount. Typically, the crosslinking agent is present in an amount of from about 0.1 to about 15 percent by weight of the water-soluble compound, preferably from about 0.5 to about 10 percent by weight of the water-soluble compound, more preferably from about 2 to about 6 percent by weight of the water-soluble compound, although the amount can be outside these ranges.

The usefulness of various crosslinking agents and cross-linkable water-soluble compounds will vary depending on the expected downhole environment and the amount of time the shell is expected to maintain integrity. Some combinations of crosslinkers and cross-linkable compounds form very inert compositions, while other combinations form readily dissolvable compositions. For example, use of glutaraldehyde as a crosslinking agent for collagen forms a more inert and resistant compound than, for example, zoldine cross-linked collage. It is within the ability of one skilled in the art, given the benefit of this disclosure, to create formulations that have the desired resistance to degradation for a particular utility.

Methods of preparing collagen and adding crosslinking agents are described in U.S. Pat. No. 4,061,787, the disclosure of which is incorporated herein by reference.

It is recognized that some shells may be comprised of compositions that vary with depth. This may be the case when, for example, an outer portion contains more of, or a different, crosslinker than the inner portion. The inner portion, or the outer portion, may therefore have different properties, for example, be more resistant to degradation or to diffusion of the encased material. Such a shell may be useful for example, the timed release of chemical into a flux of fluids in the wellbore.

It is important that the shell does not degrade prematurely, and does not leave residue. It is recognized that small fragments of a shell may be carried out of the well by the flux of fluids, without dissolving in the traditional sense.

Other compounds may be added to modify the shell properties. For example, adding refined oil will decrease the hydrophilic character of the shell, thereby making it more inert to the brine in the wellbore. Glycerin and the like help stabilize shells during the curing process, but do not substantially lengthen the dissolution time to the extent oils do. Polymers and filaments may be added to increase strength or otherwise modify the shell properties.

In molding, the temperature can range from subambient, i.e., about 60° F., to near boiling, i.e., about 212° F. The optimum curing time and conditions depends on the combination of water-soluble polymers and crosslinkers selected. Glutaraldehyde can crosslink collage at a wider range of temperatures than, for example, zoldine. Curing temperatures between about 80° F. and 160° F. are generally preferred from an operational standpoint.

Preliminary curing generally takes an hour to twelve hours, and then the shells or encased materials are best, but not necessarily, set aside for additional curing and drying. A fully cured shell will be resistant to deformation by moderate force and abrasion, i.e., a cured shell will not deform or be able to be desegregated with a fingernail.

Catalysts may aid the cross-linking process. Catalysts will be highly specific on the cross-linkable compounds and on the crosslinkers selected, as many combinations require no catalysts. Examples of catalysts include p-toluene sulfonic acid (such as CYCAT4040, available from American Cyanamid Company), magnesium chloride (available from Aldrich Chemical Company), dimethylaminomethyl phenols (such as DMP-10, available from Rohm and Haas, Inc.), and the like, as well as mixtures thereof.

The catalyst is present in the first coating in any effective amount. Typically, the catalyst is present in an amount of from about 5 to about 75 percent by weight of the crosslinking agent, and preferably from about 10 to about 50 percent by weight of the crosslinking agent, although the amount can be outside of these ranges.

The preferred shell is made from various combinations of zoldine, collagen, oil, and water. Gycerin and polymeric additives are advantageously included. Typically, especially for collagen-based shells, the shell must be air-dried after curing. The time needed to dry a shell can be substantial, and controlling temperature and relative humidity can reduce this time.

The preferred shell compositions are comprised of water-soluble polymers, preferably collagen, a crosslinking agent, preferably an oxazole or an oxazolidine, and a hydrophobic compound, preferably a processed oil. Residual water is also typically present in the shell composition. Blends of one or more crosslinkable polymers, one or more crosslinkers, one or more modifier, and one or more catalysts can also be employed.

The shell is in contact with the substrate material or apparatus. The shell is of any effective thickness, typically from about 1 to about 25 millimeters, although the thickness can be outside of these ranges.

In one embodiment of the invention soap, that is, a surfactant, is encased in a shell that is about one eighth of an inch thick. The soap can be either rectangular, cylindrical, spherical, or any other shape that allows passage down a well. The soap diameter can be between about 1 inch and about 3 inches in diameter. The thickness is not important, except the size must be such that the soap fits through tubulars in the well. The soap is put into the well and can be displaced down the well with injected fluid, or allowed to freefall through the fluid. The encased soap reaches the bottom of the well before the shell has dissolved to the extent that the soap is exposed. Once the shell dissolves, and the soap dissolves in the water. This soap later assists in starting the well by lifting, or helps production by facilitating lifting of fluids in the well by gasification.

Other chemicals that can be usefully encased include lime, scale inhibitors, asphaltene inhibitors or dispersants, gels, acids, pH adjusters and buffers, chelants, and the like. A class of chemicals that is especially well suited for encasement are corrosion inhibitors. Such inhibitors are needed from the perforations up. In some applications, a wax-corrosion inhibitor solid is manufactured and put downhole. The encasement allows more effective liquid inhibitors to be used, and eases the handling and placement problems. In addition, inhibitors encased in water-soluble shells can be used even in cool wells where wax may not be appropriate, as lower melting point waxes have substantial handling, storage, and shipping problems.

For those chemicals that may themselves dissolve the casing, such as acids, it is often advantageous to have a water-resistant layer, such as wax, a hydrocarbon, or a gel that prevents the chemical from prematurely attacking the shell.

If wax is used on the interior of the shell to isolate a reactive encased material from the shell of this invention, the wax will protect the shell during manufacture and transport of the encased material. The wax will be selected so that it melts at a temperature below that temperature of the well at which the encased material is intended to be released. Petroleum derived paraffinic waxes having a melting point between about 100° F. and about 450° F. are preferred.

In another embodiment of this invention, the shell itself is coated with a multilayer encapsulation where more than one soluble shell material and/or thermally sensitive material, i.e., wax, is used in discrete layers. Discrete layers of wax and water soluble material is one preferred embodiment. The wax prevents water from attacking and dissolving the shell until the wax dissolves away in the high temperature environment downhole. Wax may also facilitate handling when there is concern that the encased material may diffuse through the shell.

Another material that can be encased in a water-soluble shell is scale inhibitor. The scale inhibitor can be fluid or solid, and can be dispersed throughout the shell, encased in one continuous mass inside the shell, or encased in a plurality of small, that is, less than about 0.5 inches, preferably less than 0.25 inches in diameter, cavities within the shell. In one embodiment, the shell may be very inert, including combinations of crosslinkable compounds, crosslinkers, and additives such that the dissolution of the shell in water and the subsequent release of scale inhibitor is very slow.

The present invention relates to a method for treating wells and subterranean formations and in one of its aspects relates to a method for treating a subterranean (e.g. hydrocarbon-bearing) formation to alter the flow profile through the formation by injecting a solution of ungelled gelatin into the more permeable zones of the formation and then allowing the gelatin to gel to thereby block or restrict flow through the more permeable zones. The gel is encased in a shell and transported therein to the bottom of the well.

It is necessary to select a casing for the specific range of temperatures which will be encountered when practicing the invention in a wellbore. A hydrocarbon formation along the Gulf Coast may have a formation temperature of over 250° F. This assumes a temperature gradient of 1.1° F. per hundred feet of well depth.

The reaction-preventive casing must be substantially chemically inert to the encapsulated material and to the external medium around it, at the temperatures encountered, for a specific amount of time needed to place the encased material. The casing should be resistant to diffusion in either direction, resistant to breakage from mechanical forces, and generally stable through temperature variations. Additionally, the casing must dissolve at the proper time.

The casings must also be able to resist substantial physical and mechanical forces without breaking. The encapsulation must remain sufficiently intact during the pumping and circulation processes encountered in placing a material downhole so that a significant amount of material is not released into the well before the desired time. The shearing forces placed on the shells may be substantial, especially for shells encasing larger apparatuses.

Additionally, the protective casings must be able to survive storage, wherein capsule breakage may occur as a result of the weight of the encapsulated material stored in barrels and tanks. For this reason, it may be necessary to perform a washing treatment on the encapsulated materials when removing it from storage prior to use in well workovers or stimulation treatment.

For ease of encapsulation, spherical shaped particles are generally preferred for most encapsulation processes. By spherical it is meant substantially spherical, wherein the edges are rounded and the longest dimension is no more than about two times the shortest dimension. However, a spherical shape is not crucial for some coating processes. Furthermore, a spherical shape is stronger structurally than other shapes, and is more likely to survive unbroken in storage and in transit down a wellbore. Cylindrical shapes, on the other hand, would fall through the fluid and tend to reach the bottom of a well more quickly than other shapes.

The encapsulation process can be one of many methods well known in the art, such as spray coating, condensation, electrostatic coating, and solvent deposition. Most typically, because curing time is often substantial, injection molding is the preferred method of manufacture.

One method of encapsulating a bulk material within a shell is to mix the material with precursor to the casing, i.e., with the cross-linkable compound, until a uniform mixture is obtained. The mixture is then admixed with the crosslinker and solidified.

Some encapsulation methods such as spray deposition are more amenable for encapsulating larger apparatuses.

It is occasionally desirable to add weighing agents to the encased materials so that they can sink in a wellbore. The specific gravity of the shell can range from about 0.5 to about 2, but it is typically between 1 and 1.3. The weighing material is preferably water soluble, for example, calcium chloride, but may be of insoluble materials including granular barite which will on release simply fall into the rat-hole below the perforations. The amount of weighing agent should be sufficient to give the apparatus an overall density of greater than about 1.5 grams per cubic centimeter, preferably greater than about 2 grams per cubic centimeter.

These encased materials are particularly advantageous when a particular chemical is needed at a location downhole, that is, below the wellhead. In addition to soap, asphaltene-inhibitors, scale inhibitors, and corrosion inhibitors are particularly advantageously placed in the aqueous phase near the bottom of a well. These materials are typically needed to protect the wellbore. A series of free falling balls can replace downhole chemical injection pumps.

Chemical diffusion through the casings is occasionally desired, for example in certain applications with materials that are needed in low concentrations, such as scale inhibitors. When diffusion is not desired, waxy inner coatings, thicker coatings, certain additives, and occasionally dissimilar crosslinked water-soluble compounds are used in laminate form with multilayer encapsulation, i.e. two or more discrete coatings, with the interface being either distinct or a gradation from one coating to another.

Similarly, it is recognized that two or more materials may be encased in a single shell, either mixed if they are compatible or separated by shell material if compatibility problems exist.

The invention is also useful for workovers and the like where there are fluids in the wellbore that are incompatible with fluids that need to be placed downhole. For example, during fracturing of formations, it is sometimes advantageous to place chemicals not compatible with frac fluids, such as gel breakers, at the bottom of the well. These materials will then be freed from the encapsulating casing, and they can be pumped into the fracture without displacing a wellbore of fluid into the formation.

One particular advantage of the water-soluble shell is that it can be used to place prefabricated mechanical devices downhole. For example, a pipe that can be lowered into and retrieved from a well may be encapsulated. Then, a sand-control pack made from, for example, resin coated screens and/or resin coated proppant, can be built around the outside of the encased pipe. Manufacture of resin coated proppant is described in, for example, U.S. Pat. No. 5,955,144, the disclosure of which is incorporated herein by reference. This pipe can then be lowered into the well, and when the shell dissolves, the pipe may be easily removed from the sand-control pack and withdrawn from the well.

This sand-control pack, or screenless sand pack, may then itself be advantageously coated with a water-soluble shell. This outer coating helps protect the sand-control pack during transit down the wellbore, but is not necessary in all cases. The shell helps maintain screen and/or sand configurations until the resin sets. Such a shell is particularly desirable when there is only a screen or a resin coated screen, since such screens are often damaged during transit down a wellbore. Resins that coat proppant and screens are typically not tacky at ambient temperatures, but are best if they are not fully cured until downhole temperatures are encountered.

Wells are treated by encapsulating well or formation treatment chemicals in a water-soluble casing designed to protect the encased material for a predetermined amount of time, and then to dissolve in the aqueous phase. This encased material is placed at the desired location within the well. Preferred methods of placement include lowering encased apparatuses on a slickline or workover string. The preferred method of placement of encased materials is allowing the encased materials to fall through the fluid in the wellbore. The falling velocity may be enhanced by weights, by injecting fluids, or by altering the size and shape of the encased material. Long thick cylinders will tend to have the greatest fall velocity, but they may be damaged on collision with the wellbottom if not properly designed. Spheres fall much more slowly. The shell is designed to protect the encased material or apparatus until the material or apparatus is substantially in place in the well. Preferably, the casing is of sufficient resistance to allow a safety factor in case the materials take longer than anticipated to reach the desired location,

What is claimed is:

1. An apparatus for treating wells comprising:
   a) a material useful for treating wells; and
   b) a water-soluble shell substantially encasing the material, said shell comprising a water-soluble polymer and a cross-linking agent, wherein at least a portion of the water-soluble polymer is cross-linked with the proviso that the cross-linking agent is not a chromic carboxylate complex.

2. The apparatus of claim 1 wherein the water-soluble shell dissolves in the water in the well in a period of time ranging from about 1 hour to about 2 weeks.

3. The apparatus of claim 1 wherein the water-soluble polymer comprises collagen.

4. The apparatus of claim 1 wherein the water-soluble polymer comprises polysaccharide gum.

5. The apparatus of claim 1 wherein the water-soluble polymer comprises hydroxyethyl starch, hydroxypropyl starch, or a mixture thereof.

6. The apparatus of claim 1 wherein the water-soluble polymer comprises methyl cellulose, hydroxyethyl cellulose, hydroxypropyl cellulose, hydroxyethylmethyl cellulose, hydroxypropylmethyl cellulose, hydroxybutylmethyl cellulose, ethylhydroxyethyl cellulose, hydroxypropyl-hydroxyethyl cellulose, sodium cellulose sulfate, sodium carboxymethyl hydroxyethyl cellulose, diethylammoniumchloride hydroxyethyl cellulose, hydroxypropyl trimethyl ammonium chloride hydroxyethyl cellulose, diethyl aminoethyl cellulose, or a mixture thereof.

7. The apparatus of claim 1 wherein the water-soluble polymer comprises gum arabic, carrageenan gum, karaya gum, xanthan gum, carboxymethyl hydroxypropyl guar, cationic guar, or a mixture thereof.

8. The apparatus of claim 1 wherein the water-soluble polymer comprises from about 10 to about 50 percent by weight of the water-soluble shell.

9. The apparatus of claim 1 wherein the cross-linking agent comprises oxazole, an oxazolidine, or a mixture thereof.

10. The apparatus of claim 1 wherein the cross-linking agent comprises zoldine.

11. The apparatus of claim 1 wherein the cross-linking agent comprises hexamethoxy-methylmelamine, methylated melamines, partially methylated melamine-formaldehyde, methylated urea-formaldehyde, butylated urea-formaldehydes, poly (vinyl amines), cationic urea-formaldehyde resins, or mixtures thereof.

12. The apparatus of claim 1 wherein the cross-linking agent comprises glutaraldehyde, glyoxal-urea resins, dimethylaminomethyl phenols, cationic polyamide-epichlorohydrins, oxazolidines, or mixtures thereof.

13. The apparatus of claim 1 wherein the cross-linking agent comprises poly (N,N-dimethylacrylamide), poly (2-acrylamido-2-methyl propane sulfonic acid), poly (methylene-guanidine) hydrochloride, poly (N,N-dimethyl-3,5 dimethylene piperidinium chloride), acrylamide polymers, poly (ethylene imine), poly (ethylene imine) epichlorohydrin, or a mixture thereof.

14. The apparatus of claim 1 wherein the water-soluble shell further comprises a modifying compound.

15. The apparatus of claim 14 wherein the modifying compound is oil.

16. The apparatus of claim 14 wherein the modifying compound is glycerin.

17. The apparatus of claim 14 wherein the modifying compound is a polymeric additive.

18. The apparatus of claim 1 wherein the material useful for treating wells comprises soap, acid, corrosion inhibitors, chelating agents, scale inhibitors, mutual solvents, paraffin inhibitors, paraffin dissolvers, clay stabilizers, tracer materials, or mixtures thereof.

19. The apparatus of claim 1 wherein the material useful for treating wells comprises soap.

20. The apparatus of claim 1 wherein the material useful for treating wells comprises corrosion inhibitors.

21. The apparatus of claim 1 wherein the material useful for treating wells comprises a prefabricated mechanical device.

22. The apparatus of claim 21 wherein the prefabricated mechanical device is a prefabricated screen completion.

23. The apparatus of claim 21 wherein the prefabricated mechanical device is a prefabricated sand-pack, wherein said sand-pack includes resin coated screens, resin coated proppant, or both.

24. The apparatus of claim 23 wherein the prefabricated sand-pack is built around the outside of an encased pipe, wherein said pipe has a connector to attached near the upward end, and wherein said pipe has a dissolvable shell between the pipe and the sand-pack.

25. The apparatus of claim 1 wherein the shell is between about 1 to about 25 millimeters in thickness.

26. The apparatus of claim 1 wherein the shell comprises multiple layers encasing the material.

27. The apparatus of claim 1 further comprising a wax layer between the material and the shell.

28. The apparatus of claim 1 further comprising a wax layer, wherein said wax layer substantially encases the shell, and wherein said wax layer will melt at the temperature below that temperature of the well at which the encased material is intended to be released.

29. The apparatus of claim 1 wherein the material is a scale inhibitor.

30. The apparatus of claim 29 wherein the scale inhibitor is dispersed throughout the shell.

31. The apparatus of claim 30 wherein the scale inhibitor is encased in a plurality of cavities within the shell, wherein the cavities are less than about 0.5 inches in diameter.

32. The apparatus of claim 1 further comprising a weighing agent, wherein the quantity of the weighing agent is sufficient to give the apparatus an overall density of greater than about 1.5 grams per cubic centimeter.

33. The apparatus of claim 1 further comprising a weighing agent, wherein the quantity of the weighing agent is sufficient to give the apparatus an overall density of greater than about 2 grams per cubic centimeter.

34. The apparatus of claim 1, wherein the material useful for treating wells comprises soap, corrosion inhibitor, or a mixture thereof, wherein the water-soluble polymer comprises collagen, wherein the cross-linking agent comprises zoldine, glutaraldehyde, or a mixture thereof, and wherein the water-soluble shell further comprises glycerin and oil.

35. A method of treating a well comprising:
   a) substantially encasing a material useful for treating wells in a water soluble shell, wherein said shell comprises a water-soluble polymer and a cross-linking agent, and wherein at least a portion of the water-soluble polymer is cross-linked with the proviso that the cross-linking agent is not a chromic carboxylate complex;
   b) inserting the substantially encased material into the well;
   c) transporting said encased material to the desired depth in the well; and
   d) leaving the material at the desired depth for a time sufficient for the water-soluble shell to dissolve, thereby exposing the material to fluids in the well.

36. The method of claim 35 wherein said shell further comprises oil, glycerin, or mixtures thereof.

37. The method of claim 35 wherein said time sufficient for the water-soluble shell to dissolve ranges from about 1 hour to about 2 weeks.

38. An apparatus for treating wells comprising:
   a) a material useful for treating wells; and
   b) a water-soluble shell substantially encasing the material, said shell comprising a water-soluble polymer containing collagen, and a cross-linking agent, wherein at least a portion of the water-soluble polymer is cross-linked.

39. A method of treating a well comprising:
a) substantially encasing a material useful for treating wells in a water soluble shell, wherein said shell comprises a water-soluble polymer containing collagen, and a cross-linking agent, and wherein at least a portion of the water-soluble polymer is cross-linked;
b) inserting the substantially encased material into the well;
c) transporting said encased material to the desired depth in the well; and
d) leaving the material at the desired depth for a time sufficient for the water-soluble shell to dissolve, thereby exposing the material to fluids in the well.

* * * * *